US005613358A

United States Patent [19]
Humiston et al.

[11] Patent Number: 5,613,358
[45] Date of Patent: Mar. 25, 1997

[54] REDUCED COST MEMBRANE SEAL ASSEMBLY FOR PULSED ROCKET MOTOR

[75] Inventors: Robert G. Humiston, Ogden; Joseph L. Ralston, North Ogden; Brent R. Marchant, Ogden, all of Utah

[73] Assignee: Thiokol Corporation, Ogden, Utah

[21] Appl. No.: 588,370

[22] Filed: Sep. 26, 1990

[51] Int. Cl.⁶ .................. F02K 9/26; F02K 9/38
[52] U.S. Cl. .................. 60/250; 60/253
[58] Field of Search ............... 60/253, 254, 255, 60/250, 224, 225; 137/68.1, 68.2; 220/89.1

[56] References Cited

U.S. PATENT DOCUMENTS

| | | | |
|---|---|---|---|
| 3,845,879 | 11/1974 | Dernbach et al. | 137/68.1 |
| 4,505,180 | 3/1985 | Hinrichs | 60/250 |
| 4,738,099 | 4/1988 | Hibler et al. | 60/245 |
| 4,829,765 | 5/1989 | Bolieau et al. | 60/250 |
| 4,838,447 | 6/1989 | Albracht et al. | 220/89.1 |
| 4,864,817 | 9/1989 | Fling et al. | 60/250 |

*Primary Examiner*—Michael J. Carone
*Attorney, Agent, or Firm*—Cushman Darby & Cushman IP Group of Pillsbury Madison & Sutro, LLP; Ronald L. Lyons, Esq.

[57] ABSTRACT

A membrane seal assembly separating forward and aft combustion chambers of a rocket motor. The assembly covers the aft surface of a bulkhead having apertures therein to preclude flow communication between the combustion chambers during combustion of propellant within the aft combustion chamber. The assembly includes a membrane which has a plurality of sectors which open along hinge lines away from the bulkhead to allow flow communication between the combustion chambers when a higher pressure is present in the forward combustion chamber than in the aft combustion chamber, i.e., during subsequent combustion of the propellant in the forward combustion chamber. The sectors are provided by a plurality of radially extending slits in the membrane which are formed entirely through the thickness of the membrane so that complex scoring tooling and close tolerances of manufacturing membranes with score lines is not required while maintaining reliability of the burst membrane so that the cost of the membrane seal assembly may be reduced. The pattern and sizing of apertures in the bulkhead is such, for an erodible bulkhead, that each aperture erodes into the adjacent eroding apertures in such a manner as to minimize the size of debris breaking away from the bulkhead to reduce the possibility of debris becoming lodged in the nozzle throat.

31 Claims, 5 Drawing Sheets

5,613,358

REDUCED COST MEMBRANE SEAL ASSEMBLY FOR PULSED ROCKET MOTOR

The present invention relates to solid propellant rocket motors.

The entire propulsive capacity of a single combustion chamber solid propellant rocket motor is usually spent during the combustion process of one mass of solid propellant. This is for the reason that once the solid propellant is ignited it is very difficult to stop the combustion process until the entire mass of the ignited propellant has been consumed.

Solid propellant rocket motors have been provided which have an ability to fire more than once. Such a rocket motor with a "start-stop-restart" capability is commonly called a "pulsed" rocket motor. A pulsed rocket motor is commonly built by providing within the same case two or more units or grains of solid propellant such as a boost grain and a sustain grain in separate combustion chambers separated by a membrane seal structure that enables the ignition of the propellant units to be independent of each other whereby discrete impulses are available upon command. When the solid propellant units are positioned in tandem with each other, that is, with one solid propellant unit forward of the other, the membrane seal assembly extends over the inner diameter of the rocket motor case and is attached thereto. The membrane seal assembly includes a bulkhead which includes a plurality of apertures for flow of combustion gases therethrough and also includes a thin imperforate metallic membrane or cover of high strength but ductile material which covers the aft side of the bulkhead and is covered by an insulation material to seal the forward chamber from flow of gases thereinto upon ignition of the solid propellant unit in the aft chamber and which, after the solid propellant unit in the aft chamber has been expended, pressure resulting from combustion of the solid propellant unit in the forward chamber upon ignition thereof at a selected time will cause the thin membrane to rupture along score lines and the insulation material to tear and thus allow the escape of gases from the forward chamber through the apertures in the bulkhead to the aft chamber and then out the nozzle.

Examples of pulsed rocket motors having such membrane seal assemblies are disclosed in U.S. Pat. Nos. 4,864,817 to Fling et al and 4,829,765 to Bolieau et al both of which patents are assigned to the assignee of the present invention and both of which are incorporated herein by reference. Each of these patents discloses rocket motors wherein the membrane or burst diaphragm is circular and has a plurality of score lines extending from the center portion radially outwardly to the perimeter wherein the diaphragm is scored or weakened partially through the thickness thereof so that the diaphragm may rupture along the score lines upon a pressure in the forward chamber exceeding the pressure in the aft chamber by a substantial amount when the propellant in the forward chamber is ignited. Bolieau et al also discloses an inner circular score line surrounding a through bulkhead ignition device and intersecting with the inner ends of the radial score lines.

While a burst diaphragm with a plurality of score lines as described above has generally been found to be reliable, the manufacture thereof is a costly and complex process. The frangibleness of the thin metal of the membrane requires close tolerances during manufacturing and the matching of scoring with the particular type of material. The scoring process therefore requires very elaborate tooling and manufacturing processes.

It is accordingly an object of the present invention to reduce the cost of manufacture of a membrane seal assembly for a pulsed rocket motor while maintaining the reliability thereof.

It is another object of the present invention to size and space the apertures in the bulkhead structure so as to minimize the size of ejected metal to prevent obstruction of the nozzle throat.

In order to reduce manufacturing cost yet maintain reliability of the membrane seal assembly, in accordance with the present invention a plurality of slits are formed entirely through the thickness of the membrane and terminate at a marginal portion whereby a hinge line is defined between the points of termination at the marginal portion of two adjacent slits so that the corresponding sector defined by the two adjacent slits and the hinge line may open about the hinge line to allow flow communication of combustion gases through the apertures in the bulkhead between the two rocket motor combustion chambers.

Other objects, features, and advantages of the present invention will become apparent in the following detailed description of the preferred embodiments of the invention taken in conjunction with the accompanying drawings.

DETAILED DESCRIPTION OF THE PREFERRED EMBODIMENTS

Figure 1:
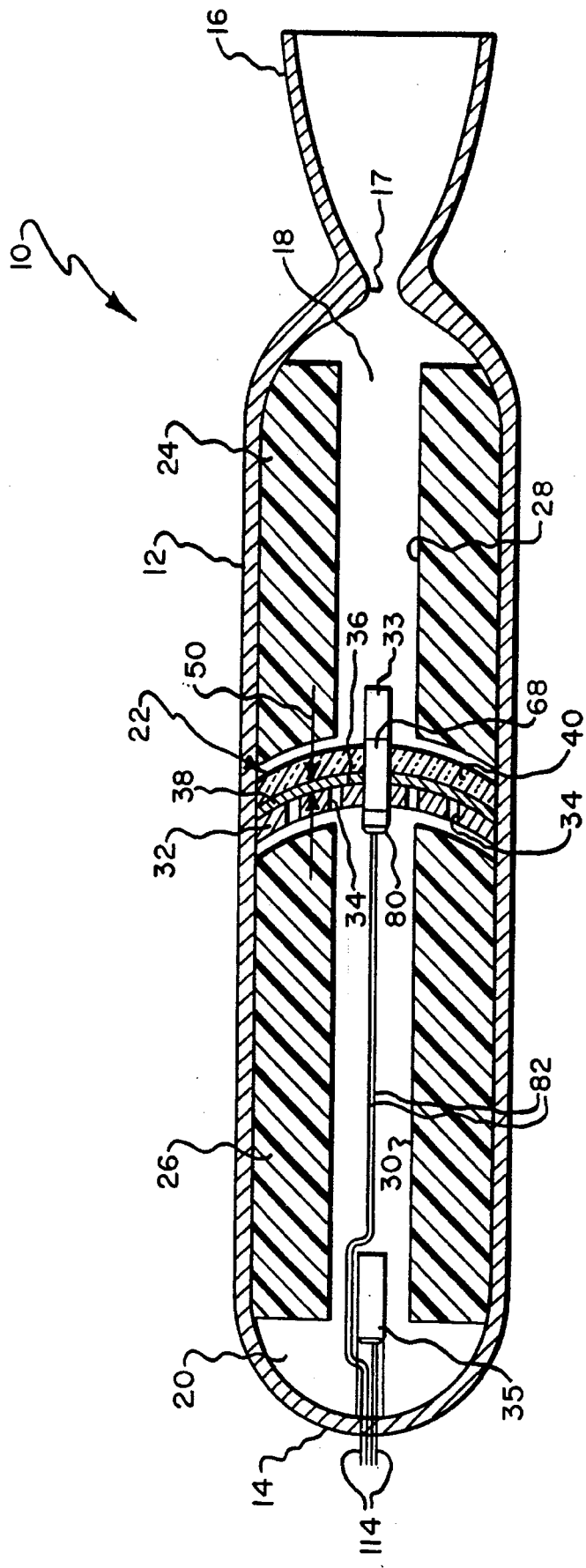
FIG. 1 is a schematic side sectional view of a rocket motor embodying the present invention.

Referring to FIG. 1, there is generally illustrated at 10 a dual chamber pulsed rocket motor which includes an elongate generally cylindrical case 12 which is closed at its forward end by a suitable domed structure 14 and which is composed of aluminum, steel, or other suitable metal or a suitable matrix impregnated fibrous composite material. The case inner diameter may, for example, be perhaps 7.5 inches. A suitable nozzle 16 of the converging-diverging type commonly known to those of ordinary skill in the art to which this invention pertains is attached to the aft end of the case 12 in flow communication with the interior of the case for controllably releasing propulsive gases therefrom for propulsion of the rocket motor.

The rocket motor 10 contains an aft or first combustion chamber 18 and a forward or second combustion chamber 20 which are separated by a membrane seal assembly generally indicated at 22 which extends over the inner diameter of the case 12 and is attached thereto. Contained within the combustion chambers 18 and 20 are units or grains of solid propellant material 24 and 26 respectively which may be of any type suitable for the requirements of the rocket motor 10. While the propellant material may be of any suitable type, an example thereof may be found in U.S. Pat. No. 3,764,319 to Hightower, Jr. et al which is assigned to the assignee of the present invention and which patent is hereby incorporated herein by reference. Depending upon the particular requirements of the rocket motor 10, the propellant material for propellant 26 may be the same as or different from that for propellant 24. Solid propellant grains 24 and 26 have central axial perforations 28 and 30 respectively therein. While rocket motor 10 is shown as having two combustion chambers, it should be understood that an embodiment which has more than two combustion chambers with a seal assembly 22 disposed between each pair of adjacent combustion chambers is meant to come within the scope of the present invention. Likewise, while the propellant material is shown to have central perforations therein, it may be otherwise suitably shaped such as by having an "end burner" configuration, and such other configurations are meant to come within the scope of the present invention.

Suitable igniters 33 and 35 are provided for igniting the respective solid propellant grains 24 and 26. The type of igniter and location thereof may be selected using principles commonly known to those of ordinary skill in the art to which this invention pertains.

A bulkhead 32 is attached to the case 12 and provides a structural barrier between the combustion chambers 18 and 20 and also includes a plurality of apertures 34 extending axially therethrough to provide flow communication between the combustion chambers 18 and 20. The aft surface 36 of the bulkhead 32 including all of the apertures 34 is covered with a thin imperforate membrane 38 to serve as a barrier to flow communication through the apertures 34 during combustion of the aft propellant grain 24. After the aft propellant grain is consumed and the forward propellant grain 26 is thereafter ignited, it is desired that communication be provided between the chambers 18 and 20 so that gases of combustion may flow from the forward chamber 20 through the apertures 34 into the aft chamber 18 and then out the nozzle 16 producing thrust. The membrane 38 is constructed so that it may open up to uncover the apertures 34 to thereby allow such flow communication as will be described in greater detail hereinafter. The total area of the bulkhead apertures 34 must be a predetermined ratio to the area of the nozzle throat 17 in order that the combustion gases be choked in the nozzle and not in the bulkhead during combustion of the forward propellant 26. A layer 40 of suitable insulation material, which may have a thickness of perhaps 0.1 to 0.2 inch, covers the membrane 38 for protection thereof and also to seal against and thereby preclude any flow of combustion gases into the forward chamber 20 during combustion of the propellant material 24 in the aft chamber 18. The insulation material 40 rips apart as the membrane 38 is opened up.

Figure 2:
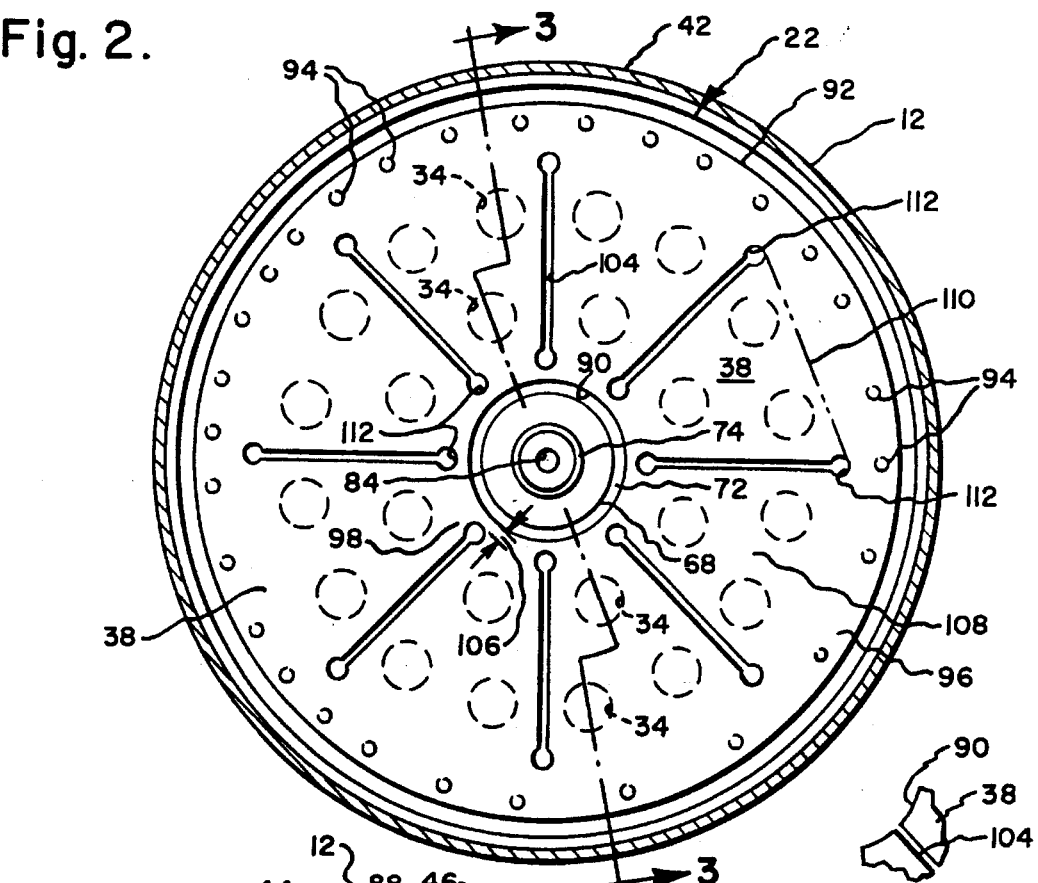
FIG. 2 is a plan view, as viewed from aft thereof, of a membrane seal assembly, with some parts not shown for purposes of clarity, for the rocket motor of FIG. 1.
Figure 3:
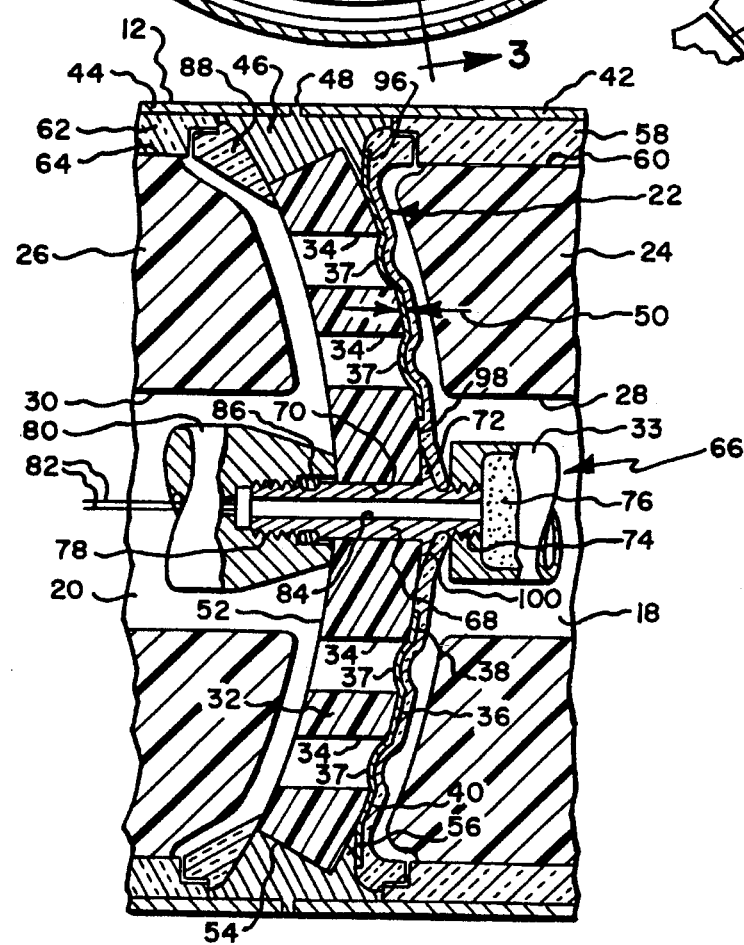
FIG. 3 is a sectional view of the assembly of FIG. 2 taken along lines 3—3 thereof.

Referring to FIGS. 2 and 3, there is shown a more detailed view of the membrane seal assembly 22, the insulation 40 and igniter 33 being removed from FIG. 2 for greater clarity. As shown therein, the case 12 includes aft and forward case segments 42 and 44 respectively which are aligned in end-to-end relationship. An annular bulkhead support ring 46, composed of a suitable material such as, for example, titanium or stainless steel, is attached to the forward end portion of the aft case segment 42 and the aft end portion of the forward case segment 44 by any suitable means such as, for example, as described in the aforesaid Bolieau et al patent. The support ring 46 has a circumferential radially outwardly extending ridge 48 thereon to which the end portions of the case segments 42 and 44 abut for precise positioning thereof.

The bulkhead 32 is an arched structure which has a convex aft surface 36 facing the aft chamber 18 and a concave forward surface 52 facing the forward chamber 20, which surfaces are generally parallel. The bulkhead 32 has an annular radially outer surface 54 which is engaged by a corresponding surface of the support ring 46 for retention thereof. The support ring 46 includes an inwardly extending lip 56 which engages the radially outer portion of the aft convex surface 36 for precisely positioning the bulkhead 32 and for preventing its movement in the aft direction during combustion of the forward propellant grain 26.

In order that the bulkhead 32 may remain in position and not be eroded away during combustion of the forward solid propellant 26, the bulkhead 32 may be composed of a suitable erosion-resistant material such as a molded silica or carbon phenolic or other suitable composite phenolic. The thickness of the material may perhaps be on the order of 1 inch.

The support ring 46 is composed of a suitable metal such as stainless steel to suitably transfer the load from the bulkhead 32 to the case 12. The ridge or locating shoulder 48 may be suitably welded to the case segments 42 and 44 by a localized heat source such as, for example, laser welding or electron beam welding so that the welding may be performed safely in view of the propellant material being within the case.

The bulkhead 32 is provided with a convex surface 36 facing the aft chamber 18 so as to place the bulkhead in compression during the build up of pressure in the aft chamber 18 as the propellant therein is consumed, the silica or carbon phenolic material of which the bulkhead is composed exhibiting better properties of strength when in compression than when in tension.

Suitable insulation 58 including a suitable liner 60 is provided between the aft propellant grain 24 and the aft case segment 42 and suitably bonded thereto in accordance with principles commonly known to those of ordinary skill in the art to which this invention pertains. Similarly, suitable insulation 62 including a suitable liner 64 is provided between the forward propellant grain 26 and the forward case segment 44.

A suitable through-bulkhead igniter apparatus, generally illustrated at 66, for the aft propellant grain 24 is provided which may be similar to that disclosed in the Bolieau et al patent. The igniter apparatus 66 includes a tubular feed-through connector 68 which extends through a central aperture 70 in the bulkhead 32. An annular ridge 72 extends radially outwardly of the connector 68 and engages the aft surface 36 of the bulkhead 32 so that the igniter apparatus 66 may be precisely positioned and to prevent pressure in the aft chamber 18 from blowing the connector 68 into the forward chamber 20. The connector 68 extends axially beyond the ridge 72 and has suitable means such as screw threads 74 for threadedly receiving the igniter 33. The igniter 33 may be of any suitable type such as a consumable type commonly known to those of ordinary skill in the art to which this invention pertains and contains a chamber in which is contained a suitable pyrotechnic material 76. Any one of a number of compositions may be used for the pyrotechnic material 76, a typical composition being a granular mixture by weight of 25% boron and 75% potassium nitrate. The other end of the connector 68 extends into the forward chamber 20 and has screw threads 78 or other suitable means for threadedly receiving a suitable initiation device 80 which is provided with suitable means such as electric wires 82 for conducting an electric charge to the initiator 80 which creates a flame front in accordance with principles commonly known to those of ordinary skill in the art to which this invention pertains. The connector 68 has a central longitudinal bore 84 which provides communication for the flame front between the initiator on the forward side of the bulkhead and the pyrotechnic material 76 in the igniter 33 on the aft side of the bulkhead to ignite the pyrotechnic material. The pyrotechnic material is burned to generate sufficient hot gases to ignite the propellant material 24. A suitable seal 86 is provided between the initiator 80 and the connector 68 at a location between the threads 78 and the bulkhead. Pressure from the aft chamber 18 is sealed off by means of a "through-bulkhead-initiation" type structure commonly known to those of ordinary skill in the art to which this invention pertains.

An annular portion of insulation 88 is bonded or otherwise suitably attached to the forward surface of the support ring 46 to protect it from the hot gases generated in the forward chamber 20 so that the structural integrity of connection of the case segments 42 and 44 may be maintained.

As shown in FIG. 2, the membrane 38 is circular in shape, has a central aperture defined by an inner edge 90 through which connector 68 extends, and has an outer edge 92. The membrane 38 covers the convex aft surface 36 of the bulkhead 32 with the inner edge 90 being inwardly of the innermost of the apertures 34 therein and extending outwardly beyond the outermost of the apertures 34 and extending onto the support ring lip 56 where the peripheral portion 96 of the membrane 38 bordering the outer edge 92 is attached to the support ring 46, so that it is prevented from falling into and obstructing the nozzle throat 17 when the forward propellant 26 is ignited, by suitable means such as, for example, multiple circumferentially spaced spot or stitch welds, illustrated at 94, which may, for example, be provided by electrical resistance welding or inert gas welding. The membrane thickness, illustrated at 50, which depends upon the size of the apertures 34, motor pressure, and strength of the material, may vary from perhaps 0.01 to 0.02 inch. The membrane portions 96 and 98 bordering the respective outer and inner edges 92 and 90 respectively are defined herein as marginal portions, the portion 96 bordering the outer edge 92 being called more specifically a peripheral portion. Peripheral portion 96 is further defined as lying outwardly of the outermost of the apertures 34, and the inner marginal portion 98 is further defined as lying inwardly of the innermost of the apertures 34. Thus, the intermediate portion of the membrane 38 which covers all of the apertures 34 lies between the marginal portions 96 and 98. The inner membrane edge 90 is positioned intermediate the connector ridge 72 and the innermost of the apertures 34. The insulation member 40, which is generally circular, covers the membrane 38 and extends outwardly beyond the peripheral portion 96 to mate with the insulation 58, as shown in FIG. 3, and inwardly beyond the inner edge 90 and along the convex bulkhead surface 36 and onto an aft surface of the connector ridge 72 for protection thereof and to prevent hot gases from escaping through the apertures 34 into the forward chamber 20 during combustion of the aft propellant 24. A vulcanization seal 100 is provided between the insulation member 40 and the connector ridge 72 which, as shown in FIG. 3, is tapered for receiving the insulation member for vulcanization thereto. A vulcanization bond is also provided between the insulation member 40 and the portions of the membrane 38, the support ring 46, and the bulkhead 32 which it engages.

In order to provide an inexpensive yet reliable means not requiring elaborate manufacturing processes and tooling for allowing the membrane 38 to open up to allow passage of gases through apertures 34 when a substantially higher pressure is present in the forward combustion chamber 20 than in the aft combustion chamber 18, in accordance with the present invention a plurality of perhaps 8 equally circumferentially spaced radially extending slits 104 are cut or otherwise suitably formed all the way through the thickness, illustrated at 50 in FIGS. 1 and 3, of the membrane 38. Each of the slits 104 extends radially outwardly beyond the outermost of the apertures 34 and terminates short of the outer edge 92, i.e., each of the slits 104 terminates at the peripheral portion 96. Thus, the peripheral portion 96 is further defined as not including the slits.

In order to prevent extrusion of membrane material into apertures 34, the slits 104 are preferably positioned so that they do not extend over any of the apertures 34 but instead extend between them so as to maintain the structural integrity of the membrane 38 over the apertures 34. Thus, the slits 104 are preferably positioned from the apertures 34 a minimum distance such as perhaps at least about 0.1 inch in order to insure against such extrusion. During pressurization of the aft combustion chamber 18, the material of the membrane 38 may penetrate slightly into the apertures and form pressure domes, if the membrane is not already pre-shaped with such pressure domes as will be discussed hereinafter, which is a factor in determining position or movement of the membrane during aft combustion chamber operation. The slits 104 and membrane are sized in conjunction with the size and shape of the apertures, in accordance with principles commonly known to those of ordinary skill in the art to which this invention pertains, to prevent substantial movement or failure of the membrane 38 by extrusion of membrane material through the apertures or otherwise. In order to assure that extrusion of membrane material through the apertures during pressurization of the aft combustion chamber or other membrane failure does not occur, the membrane 38 is composed of a rigid imperforate material such as, for example, stainless steel, which may have a thickness 50 of perhaps 0.015 inch.

Slits 104 extend inwardly beyond the innermost of the apertures 34 and preferably terminate short of the inner edge 90 a distance, illustrated at 106, of perhaps 0.1 inch to prevent the resulting sectors 108 between adjacent slits 104 from flapping around prior to installation and thereby to secure the slits to allow ease of handling and installation. This distance 106 is selected to be small enough that the thin membrane is easily tearable over that distance under a pressure of perhaps 6 to 10 psi. Thus, when the pressure is substantially greater in the forward chamber 20 than in the aft chamber 18, this pressure applied through apertures 34 will cause tearing over the distance 106 between the inner ends of slits 104 and the inner membrane edge 90 and cause the sectors 108 to move hingedly to open up about hinge lines illustrated at 110, tearing the insulation 40, to uncover the apertures 34 and thereby allow flow communication of gases from combustion of solid propellant 26 into the aft chamber 18 and then through the nozzle throat 17 to create thrust. Stress-relief holes 112, which may have a diameter of perhaps 1/8 inch, are preferably provided at both the inner and outer terminations of the slits 104.

Though the material, of which the bulkhead 32 of FIGS. 2 and 3 is made may be erosion resistant, there may still be some erosion thereof. In order to control the pattern of such erosion so as to ensure that the structure satisfactorily remains intact, the apertures 34 may be suitably spaced such as shown in FIG. 2. Thus, as an example and not for the purpose of limitation, the apertures 34, of which there are an outer and an inner row, may have a diameter of perhaps 0.3 inch, a spacing between each pair of outer apertures 34 of perhaps 0.3 inch, a spacing between each pair of inner apertures 34 of perhaps 0.37 inch, and a spacing between the centers of the outer and inner apertures of perhaps 0.53 inch. The size and number of apertures 34 will of course depend on motor pressure, and of course there may be more or less than two rows thereof.

Figure 4:
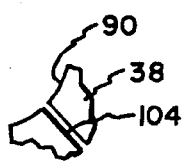
FIG. 4 is a partial view of a membrane for the assembly of FIG. 2 illustrating an alternative arrangement of slits therein.

As shown in FIG. 4, the slits 104 may, if desired, extend all the way to and intersect with the edge 90 such that each of the sectors 108 is connected to the rest of the membrane 38 only along the respective hinge line 110.

The membrane 38 is preferably preshaped by dimpling portions thereof into the apertures 34 to act as small pressure domes, illustrated at 37, so that the membrane may more effectively withstand the motor pressure in the aft combustion chamber 18. As shown in FIG. 3, the insulation 40 may follow the curvatures of the pressure domes whereby it may be of uniform thickness over the membrane surface.

Figure 5:
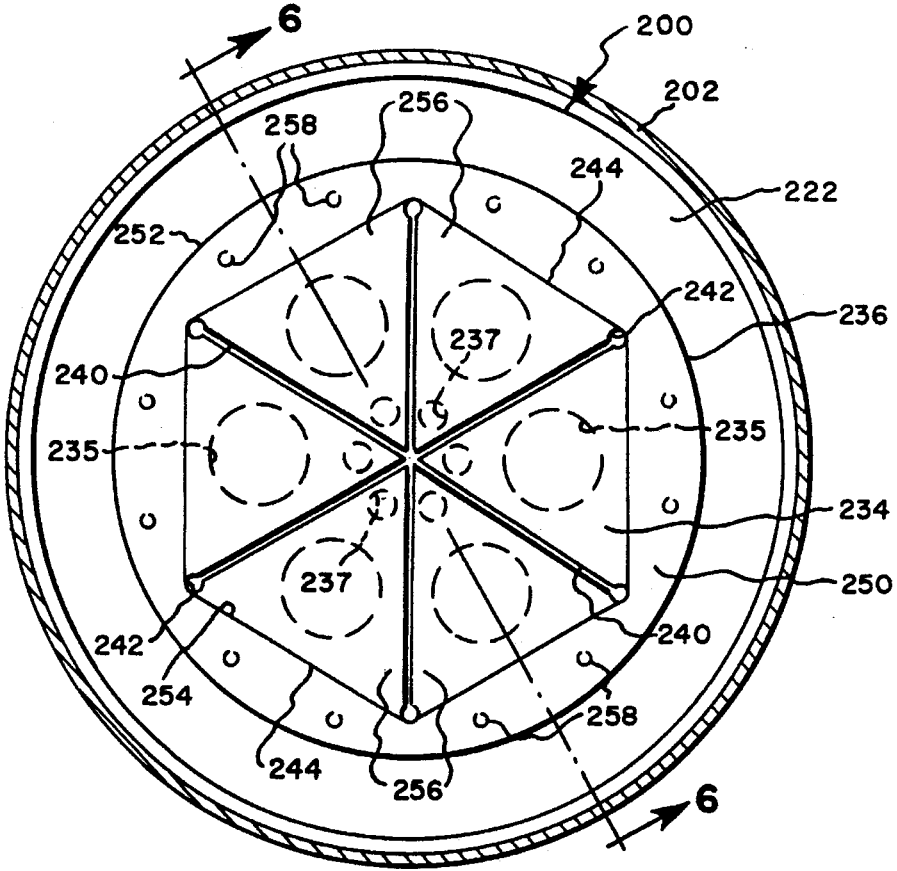
FIG. 5 is a view similar to that of FIG. 2 illustrating an alternative embodiment of the present invention.
Figure 6:
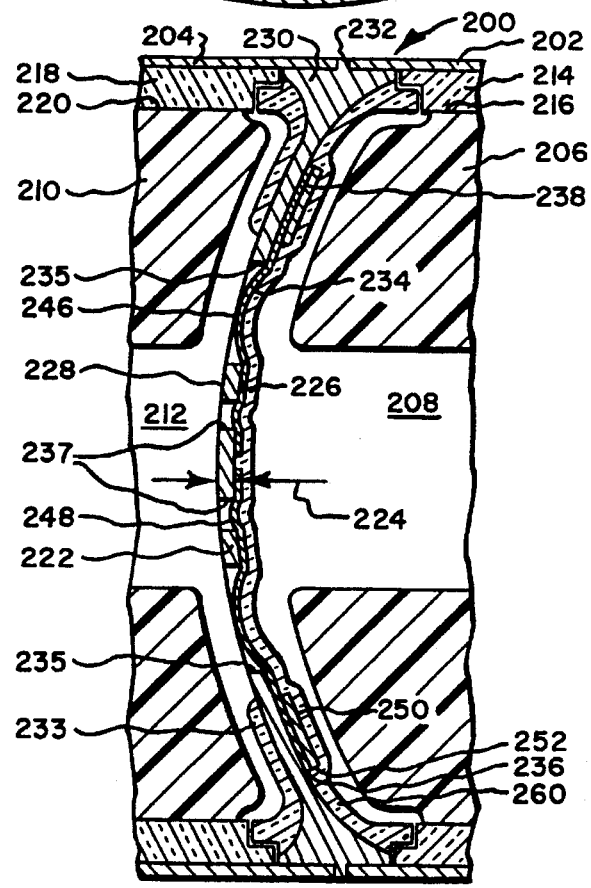
FIG. 6 is a sectional view of the embodiment of FIG. 5 taken along lines 6—6 thereof.

Referring to FIGS. 5 and 6, there is shown generally at 200 an alternative embodiment of the membrane seal assembly. In order to provide clarity of illustration, the membrane seal assembly is shown in FIG. 5 with insulation, illustrated at 260 in FIG. 6, removed. The assembly 200 is connected, as will be described in greater detail hereinafter, to the forward end portion of an aft case segment 202 and the aft end portion of a forward case segment 204. Similarly as for the rocket motor of FIGS. 2 and 3, the aft chamber 208 contains a suitable propellant grain 206 and suitable insulation 214 and a suitable liner 216 bonded between the propellant 206 and the case segment 202. The forward chamber 212 contains a suitable propellant grain 210 and suitable insulation 218 and a suitable liner 220 bonded between the case segment 204 and the propellant grain 210. In this embodiment, the membrane seal assembly 200 includes an erodible bulkhead 222 composed of steel or other suitable material which takes up a lesser volume than that of the erosion-resistant bulkhead of FIGS. 2 and 3 whereby a greater propellant volume may be provided for additional energy in the same size rocket motor. Thus, bulkhead 222 may have a thickness illustrated at 224 of perhaps ¼ inch. In order that bulkhead 222 may have the same concavity as the forward dome so that duplicate pulse and dome segments may be provided for ease of manufacture, the bulkhead 222 is provided with a concavity such that the surface 226 facing the aft chamber 208 is concave in shape and the surface 228 facing the forward chamber 212 is convex in shape, the surfaces 226 and 228 being generally parallel to each other. The bulkhead 222 extends outwardly to an enlarged portion 230, which is integral therewith for suitable attachment to the case segments 202 and 204 similarly as support ring 46, in the embodiment of FIGS. 2 and 3, is attached. The bulkhead enlarged portion 230 has a ridge 232 extending radially outwardly therefrom at which the ends of the case segments 202 and 204 abut and are suitably welded thereto as described for the embodiment of FIGS. 2 and 3 so as to precisely position the bulkhead 222 relative thereto. A row of a plurality of circumferentially spaced larger outer apertures 235 and a row of a plurality of circumferentially spaced smaller inner apertures 237 are provided in the bulkhead 222 to allow gas flow from the forward combustion chamber 212 to the aft combustion chamber 208 during combustion of the propellant 210 in the forward combustion chamber 212. An annular insulation member 233 covers the convex forward surface 228 of the bulkhead 222 along the enlarged portion 230 and extending therefrom radially inwardly to a point short of or partly surrounding the outer apertures 235 for protection of the joint between the case segments 202 and 204 to maintain structural integrity of the rocket motor case as the central portion of the bulkhead 222 is eroded during combustion of propellant in the forward combustion chamber 212.

A membrane 234, similar to membrane 38, is provided in the aft combustion chamber 208 to cover the bulkhead concave aft surface 226 including all of the apertures therein and extends radially outwardly beyond the radially outermost apertures 235 to an outer edge 236. The membrane 234 is attached to the bulkhead 222 about its circular peripheral portion 238 adjacent its outer edge 236 as will be described in greater detail hereinafter.

A plurality of slits 240 are cut or otherwise formed entirely through the membrane 234 and extend to the center and intersect with other slits at the center thus defining a center opening at the point of convergence of the slits. The slits 240 extend outwardly to the peripheral portion 238 where they terminate radially outwardly of the outermost bulkhead apertures 235 but radially inwardly of the membrane outer edge 236. Stress-relief holes 242, similar to stress-relief holes 112 of the seal assembly of FIGS. 2 and 3, may be provided at the outer terminations of the slits 240. There may be perhaps six such slits 240 radiating outwardly from the center and terminating at circumferentially spaced stress-relief holes 242 so that the sectors or petals 256 defined between adjacent pairs of slits 240 are attached to the rest of the membrane 234 only at hinge lines 244 defined as extending between the points of termination, which may be stress-relief holes 242 if provided, of respective pairs of adjacent slits.

If desired, the slits 240 may be caused to terminate inwardly short of the center a short distance such that the membrane may rip to the center upon application of forward chamber pressure whereby flapping of the sectors 256 may be prevented for ease of installation.

It should be noted that in the embodiment of FIGS. 5 and 6, as well as the embodiment of FIGS. 7 and 8 discussed hereinafter, a through-bulkhead igniter assembly is not shown. Instead, other means (not shown) may be provided for igniting the aft propellant 206 such as, for example, providing the ignition means to enter through the nozzle or providing ignition means to enter through the bulkhead 222 in the vicinity of the enlarged portion 230, i.e., radially outwardly of the membrane 234 so as to maintain its integrity. Such other means may be provided using principles commonly known to those of ordinary skill in the art to which this invention pertains. Therefore, the membrane 234 may not have an inner edge similar to inner edge 90 of membrane 38 of the embodiment of FIGS. 2 and 3, although the slits 240 converge at the center thus defining a center opening.

Similarly as described for the membrane 38 of FIGS. 2 and 3, the membrane 234 is preferably preshaped by dimpling portions thereof into the apertures 235 and 237 to act as small pressure domes, as illustrated at 246 and 248 for the apertures 235 and 237 respectively, so that the membrane may more effectively withstand the motor pressure in the aft combustion chamber 208, and the insulation may similarly follow the curvatures of the pressure domes.

The concavity of the aft bulkhead surface 226 which the membrane 234 engages may undesirably cause non-uniform opening of the sectors 256 and tearing of the peripheral portion 238 as the sectors 256 are folded back. In order to prevent this effect, in accordance with a preferred embodiment of the present invention the peripheral portion 238 of the membrane is sandwiched between the bulkhead 222 and an annular support ring 250 which has an outer edge 252 coincident with the outer edge 236 of the membrane and which has a multi-sided inner edge the number of sides 254 of which are equal to the number of slits 240 with the sides 254 being generally coincident with the hinge lines 244 to provide reinforcement for folding of the sectors or petals 256 about the hinge lines 244. The support ring 250 may be composed of steel having a thickness of perhaps 0.05 inch or any other suitable material. A plurality of circumferentially spaced spot or stitch welds 258, similar to welds 94 of FIG. 2, are provided for welding the support ring 250 to the membrane 234 and the membrane 234 to the bulkhead 222 whereby the membrane and support ring are held in position and prevented from coming loose and falling into and obstructing the nozzle throat during combustion of the forward propellant grain 210.

Insulation 260, not shown in FIG. 5 to provide ease of illustration, covers the entire aft surface 226 of the bulkhead 222 including the membrane 234 and support ring 250 and is vulcanized thereto or molded separately and secondarily bonded thereto or otherwise suitably attached thereto. As the sectors 256 open up and uncover the apertures to allow the flow of gas between the combustion chambers 208 and 212, the insulation 260 tears to allow such opening up of the sectors.

Figure 9:
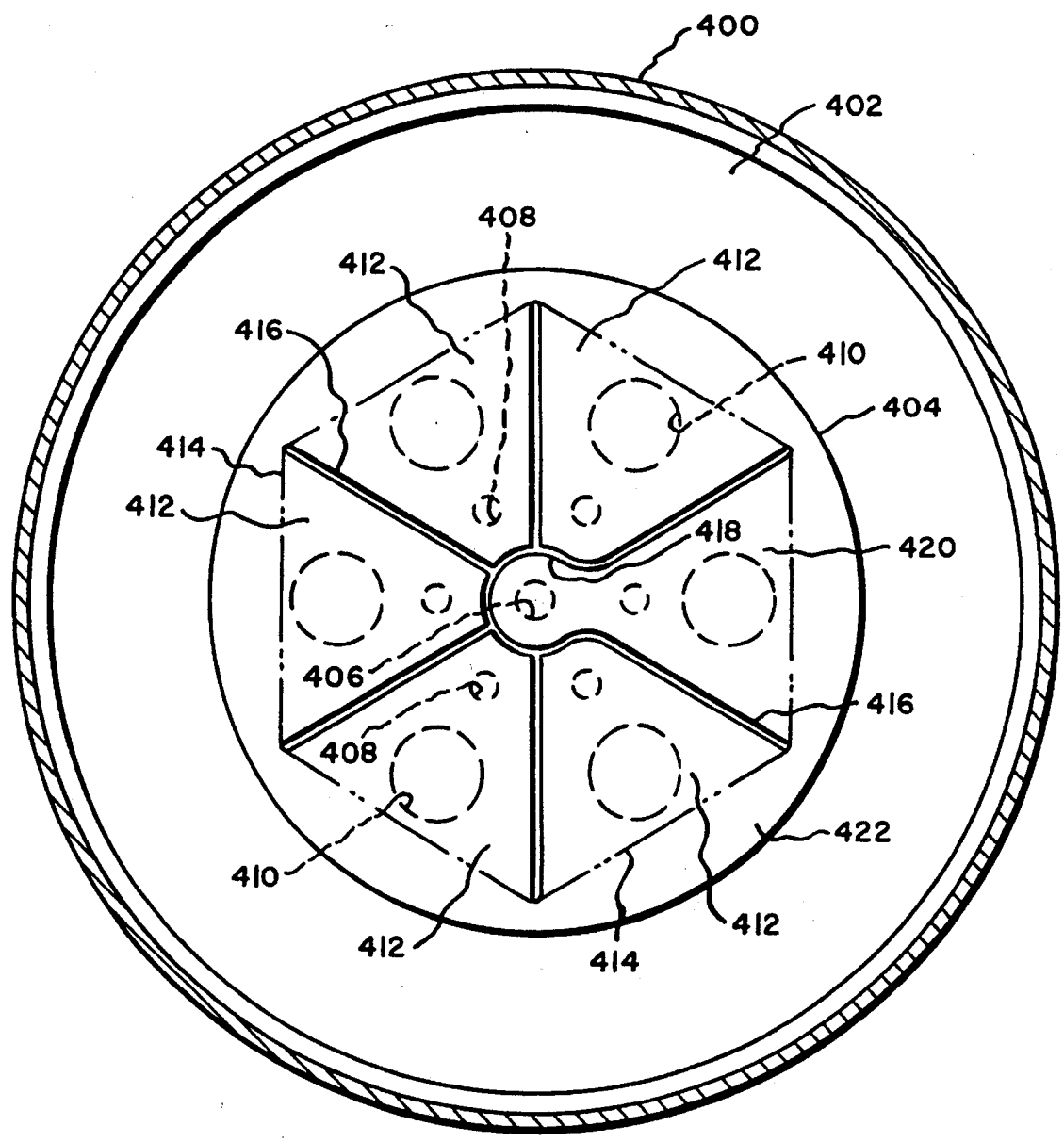
FIG. 9 is a view similar to that of FIG. 2 illustrating yet another embodiment of the present invention.

The bulkhead 222 being of an erodible type, it is desirable that as particles of metal melt away as it is eroded that these particles of metal be as small as possible so that they easily pass through the nozzle throat and not lodge therein. In order to achieve an optimum erosion pattern for achieving such a result, in accordance with a preferred embodiment of the present invention the apertures 235 and 237 ere sized and spaced in a pattern so as to minimize any remaining structure which may break off as eroding apertures and membrane edges intersect each other. As an example and not for the purpose of limitation, referring to FIG. 5, the membrane 234 is provided with six outer circumferentially spaced apertures 235 the diameter of each of which is perhaps 0.75 inch and which are spaced apart perhaps 0.375 inch, six circumferentially spaced inner apertures 237 each of which may have a diameter of perhaps 0.2 inch and which are spaced apart perhaps 0.2 inch, each outer aperture 235 being spaced from its corresponding inner aperture 237 a distance of perhaps 0.25 inch, and each inner aperture 237 being spaced from the center of the bulkhead a distance of perhaps 0.25 inch. Such an arrangement is provided so that each of the outer apertures 235 may erode to and intersect with the eroding edge of each of the adjacent ones of the outer apertures 235 and the corresponding inner apertures 237 in such a coordinated manner that only small bits of metal will break away from the bulkhead for easy passage through the nozzle throat. It should be understood that other arrangements of bulkhead apertures may be provided, using principles commonly known to those of ordinary skill in the art to which this invention pertains, which achieve the same effect. One such other arrangement is illustrated in FIG. 9 and described hereinafter.

Figure 7:
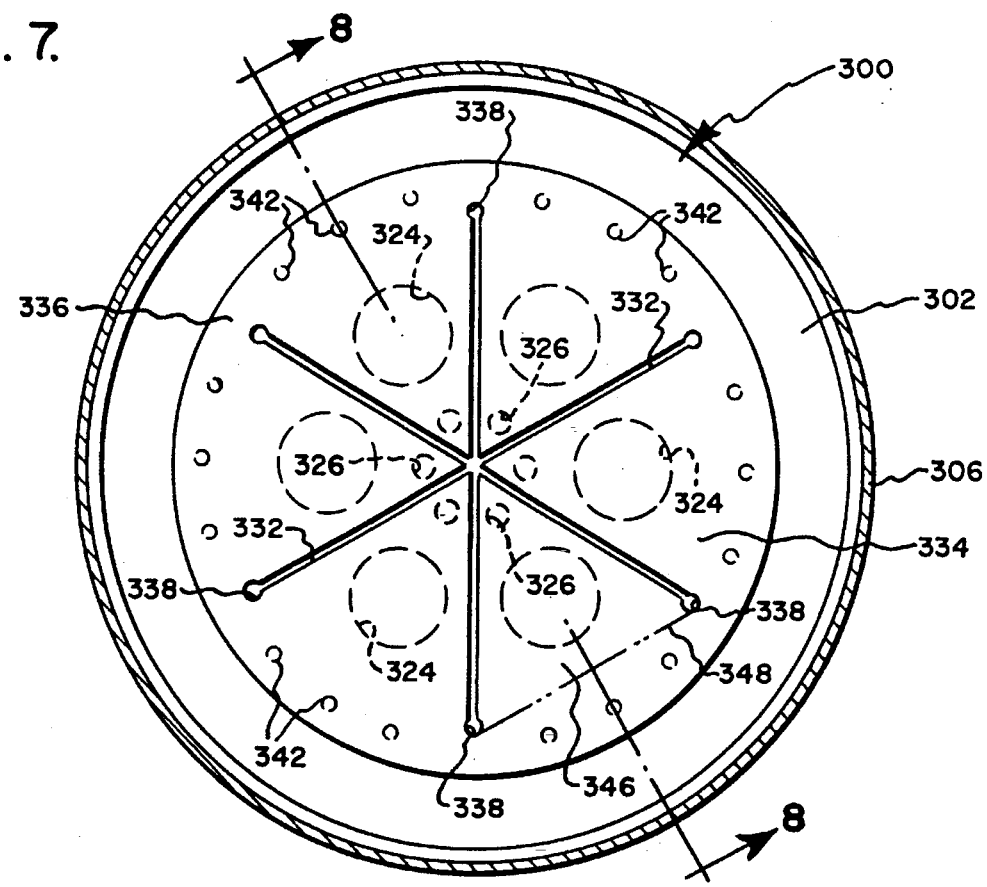
FIG. 7 is a view similar to that of FIG. 2 illustrating a further embodiment of the present invention.
Figure 8:
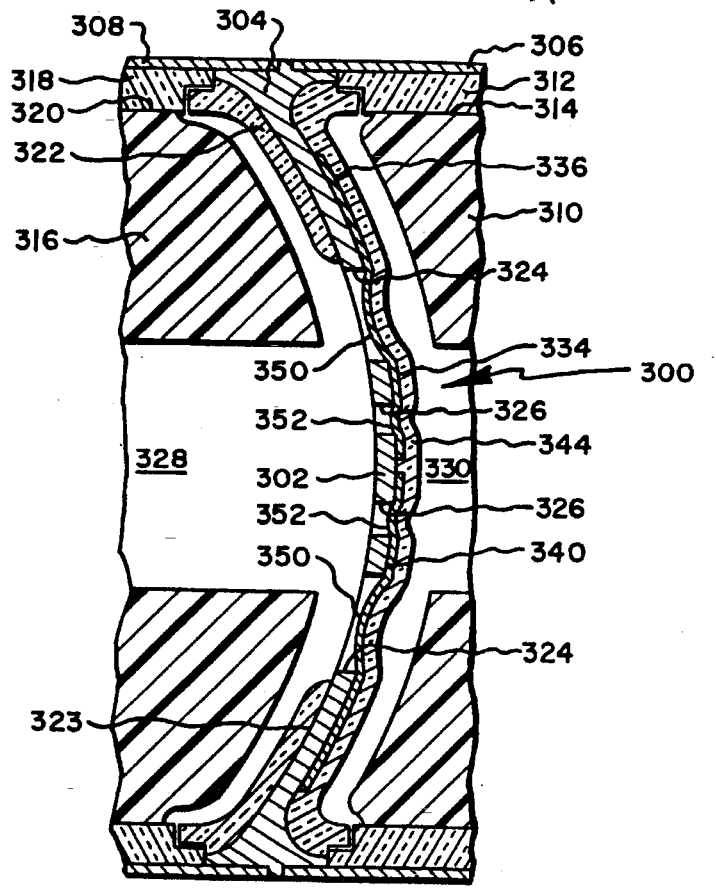
FIG. 8 is a sectional view of the embodiment of FIG. 7 taken along lines 8—8 thereof.

Referring to FIGS. 7 and 8, there is illustrated generally at 300 a membrane seal assembly in accordance with another embodiment of the present invention. The seal assembly 300 includes an erodible metal bulkhead 302, similar to bulkhead 222, which has an enlarged annular portion 304 which is attached to the forward end portion of an aft case segment 306 and the aft end portion of a forward case segment 308, similarly as the bulkhead 222 is attached to a rocket motor case. A suitable aft propellant grain 310 is contained within the aft chamber 330 defined by the aft case segment 306, and a layer of insulation 312 including a liner 314 is bonded between the propellant 310 and case segment 306, similarly as previously discussed with respect to the previous embodiments. Similarly, a suitable propellant grain 316 is provided in the forward chamber 328 defined by the forward case segment 308, and a layer of insulator 318 including a suitable liner 320 is bonded between the propellant 316 and the case segment 308. An annular insulator member 322 is provided in the forward chamber 328, similarly as insulator 233 is provided for the embodiment of FIGS. 5 and 6, to cover the forward surface 323 of the bulkhead 302 in the area of the enlarged portion 304 and extending radially inwardly to terminate short of or in partly surrounding relation to the outermost bulkhead apertures 324 for maintaining the structural integrity of the case as the middle portion of the bulkhead between the enlarged portions erodes during firing of the propellant 316 in the forward combustion chamber.

A plurality of perhaps six radially outwardly larger apertures 324 and a plurality of perhaps six corresponding radially inner smaller apertures 326 are provided, which may be similarly sized and spaced as the apertures 235 and 237 in the bulkhead of FIGS. 5 and 6 in order to achieve an erosion pattern to provide reduced sizes of ejected metal, are provided in the bulkhead 302 to provide flow communication from the forward chamber 328 to the aft chamber 330.

A circular membrane 334 having a plurality of slits 332 formed entirely through the membrane and extending radially from the center outwardly to terminate at a peripheral portion 336 which is outwardly of the apertures 324 and 326 and which may have stress-relief holes 338 at their points of termination, similar to the membrane 234 of FIGS. 5 and 6, is provided over the aft surface 340 of the bulkhead 302 to cover the apertures 324 and 326 to preclude flow communication therethrough during combustion of the propellant 310 in the aft chamber 330. The peripheral portion 336 of the membrane 334 is welded to the bulkhead 302 by means of a plurality of circumferentially spaced welds illustrated at 342, similar to welds 258 in FIG. 5, to prevent disengagement of the membrane 334 from the bulkhead 302 and its possibly blocking the nozzle throat during combustion of the forward propellant grain 316. A layer of suitable insulation 344, which, for purposes of clarity of illustration, is not shown in FIG. 7, is provided to cover the membrane 334 and bulkhead 302 along the aft surface 340 for insulation and sealing thereof, similarly as insulation 260 is provided for the embodiment of FIGS. 5 and 6. Similarly as discussed for the embodiment of FIGS. 5 and 6, a suitable ignition means (not shown in FIGS. 7 and 8) is provided for igniting the aft propellant grain 310.

In the embodiment of FIGS. 7 and 8, the aft bulkhead surface 340 has a convex shape and the forward bulkhead surface 323 has a concave shape and is generally parallel to the aft bulkhead surface 340 whereby the bulkhead 302 is placed in compression for containment of pressure of combustion of the propellant 310 in the aft combustion chamber 330. The convex shape of the aft bulkhead surface 340 and the corresponding curvature of the membrane 334 may advantageously allow the petals or sectors 346 to more precisely seek and fold about the desired respective hinge lines illustrated at 348 so that a support ring, such as shown at 250 in FIGS. 5 and 6, may not be required, thus eliminating the added cost and weight thereof.

Similarly as described for the membrane 38 of FIGS. 2 and 3, the membrane 334 is preferably preshaped by dimpling portions thereof into the apertures 324 and 326 to act as small pressure domes, as illustrated at 350 and 352 for the apertures 324 and 326 respectively, so that the membrane may more effectively withstand the motor pressure in the aft combustion chamber 330, and the insulation similarly follows the contours of the pressure domes.

FIG. 9 illustrates an alternative embodiment of the bulkhead and membrane for the seal assemblies of FIGS. 5 and 7. At 400 is illustrated the generally cylindrical case for the aft combustion chamber of a rocket motor. A bulkhead separating the forward and aft combustion chambers is illustrated at 402 and contains a pattern of apertures therein which will be hereinafter described. A membrane for covering the apertures is illustrated generally at 404. Though not shown in FIG. 9 for ease of illustration, it should of course be understood that the membrane is covered by insulation material for providing a seal similarly as shown in FIGS. 6 and 8.

As the inner row of apertures in each of the erodible bulkheads of FIGS. 5 and 7 erode to intersect each other, a larger than desired portion of bulkhead material at the center may still be ejected. In order to preclude the center of the bulkhead 402 from being ejected as a single large piece, in accordance with a preferred embodiment of the present invention an aperture 406 is provided at the center of the bulkhead 402 and sized and spaced relative to the inner row of apertures 408 so that the center aperture 406 may erode radially outwardly to intersect with the eroding edges of the inner row of apertures 408 prior to the time at which these inner apertures 408 erode together. Thus, for a row of six inner apertures 408 wherein the center aperture 406 is spaced from each of apertures 408 a distance which is equal to the distance adjacent apertures 408 are spaced apart due to the equilateral triangle configurations thereof, the center aperture 406 may, for example, be of slightly larger size than each of the apertures 408.

As the inner row of small apertures 408 thereafter continues to erode together, the first group of small particles will be ejected. The outer row of larger apertures 410 are preferably sized and spaced relative to apertures 408 so that they will still not have eroded together by this time and so that the inner apertures 408 will erode to intersect with the eroding outer apertures 410 before they intersect with each other. These outer apertures 410 will thereafter continue to erode together ejecting particles with a result that no large portions of bulkhead material are ejected during the eroding together of the aperture edges.

As an example and not for the purpose of limitation, center aperture 406 may have a diameter perhaps of 0.25 inch, each of the inner row of six apertures 408 may have a diameter perhaps 0.20 inch, each of the outer row of apertures 410 may have a diameter of perhaps 0.75 inch, a circle through the centers of the inner row of apertures 408 may have a diameter of perhaps 1.5 inches, and a circle through the centers of the outer row of apertures 410 may have a diameter of perhaps 3 inches. It should of course be understood that other patterns of apertures may be provided to achieve the same effect, and such other patterns may be obtained using principles commonly known to those of ordinary skill in the art to which this invention pertains. For example, for a membrane having less than six sectors, the center aperture may be of the same size as the apertures of the inner row of apertures but spaced closer to the inner apertures than they are spaced from each other.

The membrane 404 covers all of the apertures 406, 408, and 410 and extends radially outwardly beyond the outermost row of apertures 410 to have a peripheral portion 422 which is suitably attached to the bulkhead 402 similarly as the membranes 234 and 334 of FIGS. 5 to 8 are attached. The membrane 404 has a plurality of slits, as described in greater detail hereinafter, formed entirely through the thickness of the membrane 404 and which teminate radially outwardly at the peripheral portion 422 to define a plurality of sectors whereby the membrane 404 may bend along bend lines, illustrated at 414, for movement hingedly of the sectors to uncover the apertures 406, 408, and 410 when a pressure in the forward chamber of the rocket motor is substantially higher than a pressure in the aft chamber to allow flow communication therebetween.

In order to preclude the membrane 404 from "extruding" through an aperture, none of the slits should lie over or near an aperture and should be spaced therefrom a suitable distance which should be at least perhaps 0.1 inch. Thus, the pattern of slits includes a plurality of radially extending slits 416 each being intermediate, more preferably midway, between adjacent pairs of apertures. In the embodiment of FIG. 9, six such radially extending slits 416 are shown, it being understood that there may be more or less.

If the slits 416 intersected at the center, their point of intersection would lie over the center aperture 406 with the resulting possibility of extrusion of membrane material through the aperture 406. In order to preclude such extrusion, in accordance with a preferred embodiment of the present invention the slit pattern is provided such that each of the radial slits 416 terminates radially inwardly at a point intermediate, preferably midway between, the center aperture 406 and the inner row of apertures 408, and a slit extends circularly about the center aperture 406 and intersects the radially inner ends of each of the radial slits 416, beginning with one of the slits 416 and ending after circling substantially but not entirely around the center aperture 406 with a slit 416 adjacent thereto. Thus, a sector 420 is provided which covers a pair of corresponding inner and outer apertures 408 and 410 respectively and the center aperture 406. Each of the remaining sectors 412 terminates radially inwardly at the circular slit 418 and thus covers a pair of inner and outer apertures 408 and 410 respectively.

The sectors 256, 346, and 412 may, as shown, have the shapes of isosceles triangles, which are meant to include equilateral triangles, which have apexes at the center of the membrane, or other suitable shapes. The sectors 108, which extend to a central edge, may be said to be generally similarly shaped.

It should be understood that each of the embodiments of the present invention described herein is meant to be contained within a rocket motor similar to rocket motor 10 in FIG. 1. Operation of the membrane seal assembly of the present invention will now be described with reference to FIG. 1, it being understood that the principles of operation are equally applicable to each of the embodiments of the present invention. Operation of the rocket motor 10 begins with initiation of the igniter 33 to ignite the solid propellant material 24 in the aft combustion chamber 18. The rapid combustion of the propellant 24 produces hot gases which are expelled through the nozzle throat 17 creating thrust for propelling the rocket motor. During this period of operation, with the pressure in the aft chamber 18 being greater than the pressure in the forward chamber 20, the membrane 38 and insulation 40 sealingly cover the apertures 34 in the bulkhead 32 to preclude flow communication between the combustion chambers 18 and 20 so that the propellant material 26 in the forward chamber 20 is prevented from igniting. At a predetermined time after consumption of the aft combustion chamber propellant 24, which predetermined time is based on the particular objective to be achieved by the rocket motor, the igniter 35 is suitably initiated, by means of an electric current through wires 114 in accordance with principles commonly known to one of ordinary skill in the art to which this invention pertains, to ignite the propellant material 26 in the forward combustion chamber 20. This produces a pressure in the forward combustion chamber 20. With the pressure substantially greater in the forward combustion chamber 20 than in the aft combustion chamber 18, the pressure in the forward combustion chamber 20 acts through the apertures 34 against sectors or petals 108 of the membrane 38 to cause them to hingedly open outwardly and away from the apertures 34 in the process tearing the insulation 40 to thus allow the hot combustion gases from the forward combustion chamber 50 to flow through the apertures 34 and into the aft combustion chamber 18 afterwhich they are exhausted through the nozzle throat 17 creating thrust for further operation of the rocket motor. If more than two such pulses are desired for the rocket motor, additional combustion chambers may be provided with similar membrane seal assemblies 22 therebetween.

The provision of slits cut or formed entirely through the membrane allows the membrane to be manufactured and installed without the necessity of complex tooling and preciseness required for producing score lines to thereby advantageously reduce the cost of the membrane without sacrificing reliability.

While the membrane has been shown and described as being attached to the bulkhead along a peripheral portion with the sectors hingedly opening outwardly from the center, it should be understood that the present invention is meant to also include embodiments wherein the membrane is attached to the bulkhead along an inner marginal portion whereby the hinge lines are along the inner marginal portion.

It is to be understood that the invention is by no means limited to the specific embodiments which have been illustrated and described herein and that various modifications thereof may indeed be made which come within the scope of the present invention as defined by the appended claims.

What is claimed is:

1. A rocket motor comprising at least two combustion chambers each having propellant material therein, structural means separating said combustion chambers and having a plurality of aperture means therein for providing flow communication between said combustion chambers, a membrane seal means disposed in one of said combustion chambers for covering said aperture means and precluding flow communication between said combustion chambers when a substantially higher pressure is present in said one chamber than in the other chamber and for allowing flow communication between said chambers when a substantially higher pressure is present in said other chamber than in said one chamber, said membrane seal means comprises a membrane having a marginal portion which is attached to said structural means, said membrane characterized by a plurality of slits formed entirely through the thickness of said membrane and which extend to and terminate at said marginal portion to define a plurality of sectors integral with and extending from said marginal portion to cover said aperture means whereby said membrane may bend for movement hingedly of said sectors to uncover said aperture means when a pressure in said other chamber is substantially higher than a pressure in said one chamber to allow flow communication between said combustion chambers, and insulation means covering said membrane for precluding flow communication between said combustion chambers when a pressure in said one chamber is higher than a pressure in said other chamber.

2. A rocket motor according to claim 1 wherein said membrane is generally circular in shape and each of said sectors has a shape generally of an isosceles triangle with an apex at substantially the center of said membrane.

3. A rocket motor according to claim 1 wherein said structural means is erodible by gases of combustion of the propellant and said aperture means are sized and positioned such that as said apertures means are eroded during passage of combustion gases therethrough each aperture means will enlarge so that its eroding edge will intersect with the eroding edges of adjacent ones of said aperture means both radially and circumferentially such as to minimize the size of debris resulting from eroding of the structural means.

4. A rocket motor according to claim 3 wherein each of said aperture means is completely covered by one of said sectors.

5. A rocket motor according to claim 4 wherein said membrane is generally circular in shape and each of said sectors has the shape generally of an isosceles triangle with an apex at substantially the center of said membrane.

6. A rocket motor according to claim 5 wherein said aperture means comprises a larger aperture and a smaller aperture covered by each of said sectors, said larger aperture being spaced an equal distance from each side of said respective sector, and said smaller aperture being positioned substantially midway between said respective larger aperture and the center of said membrane and spaced an equal distance from each side of said respective sector.

7. A rocket motor according to claim 1 wherein said structural means is composed of a composite phenolic material.

8. A rocket motor according to claim 1 wherein said structural means has a surface facing said membrane seal means which has a convex shape.

9. A rocket motor according to claim 1 further comprising means including an aperture means in said membrane at each point of termination of at least a pair of adjacent ones of said slits at said marginal portion for providing stress relief during bending of said membrane for opening out of at least one of said sectors along a hinge line.

10. A rocket motor according to claim 1 wherein said marginal portion is a peripheral portion and said sectors extend inwardly from said peripheral portion.

11. A rocket motor according to claim 10 wherein said structural means has a generally circular shape, each of said aperture means is completely covered by one of said sectors, said plurality of aperture means includes a center aperture in said structural means, said plurality of slits each terminating radially inwardly at a point spaced radially from said center aperture, said membrane further characterized by a slit extending circularly around said center aperture and intersecting said points of termination of said plurality of slits from said point of termination of one of said plurality of slits to said point of termination of an adjacent one of said plurality of slits whereby one of the sectors completely covers the center aperture.

12. A rocket motor according to claim 10 wherein said structural means is erodible by gases of combustion of the propellant, said plurality of aperture means includes a center aperture surrounded by a row of six equally spaced apertures, said center aperture having a greater diameter than each of said row of six equally spaced apertures whereby the center aperture may erode such that its eroding edge intersects with the eroding edges of the row of apertures before their eroding edges intersect with each other.

13. A rocket motor according to claim 1 wherein said propellant material is solid propellant.

14. A rocket motor according to claim 1 wherein said membrane has another marginal portion, said slits extend radially between said a marginal portion and said another marginal portion and terminate at said another marginal portion at a distance from an edge of said membrane such that said membrane is tearable from the point of termination at said another marginal portion to said edge of said membrane when a pressure in said other chamber is substantially higher than a pressure in said one chamber to allow the membrane to bend for opening out of said sectors from said structural means to allow flow communication between said combustion chambers.

15. A rocket motor according to claim 1 wherein said structural means has a surface facing said membrane seal means which has a concave shape, the rocket motor further comprises a support ring means which overlies and is attached to said marginal portion such that said marginal portion is sandwiched between said support ring means and said structural means for controlling the bending of said membrane for opening out of said sectors along hinge lines.

16. A rocket motor according to claim 15 wherein said marginal portion is a peripheral portion and said sectors extend inwardly from said peripheral portion.

17. A rocket motor according to claim 1 wherein said membrane has another marginal portion, said slits extend radially entirely through said another marginal portion so that said sectors are attached to the rest of said membrane only at said marginal portion which is attached to said structural means.

18. A rocket motor according to claim 17 wherein said membrane is circular in shape and said another marginal portion is a center portion of said membrane.

19. A rocket motor according to claim 1 wherein said structural means is composed of an erosion resistant material.

20. A rocket motor according to claim 1 wherein at least one portion of said membrane covering a corresponding one of said aperture means is dome-shaped and extends into said corresponding aperture means.

21. A seal assembly for a rocket motor having at least two combustion chambers each having propellant material therein, the seal assembly comprising structural means for separating the combustion chambers and a plurality of aperture means in the structural means for providing flow communication between the combustion chambers, a membrane seal means for disposing in one of the combustion chambers and covering said aperture means for precluding flow communication between the combustion chambers when a substantially higher pressure is present in said one chamber than in the other chamber and for allowing flow communication between the chambers when a substantially higher pressure is present in said other chamber than in said one chamber, said membrane seal means comprising a membrane having a center and having a peripheral portion outwardly of said aperture means which peripheral portion is attached to said structural means, said membrane characterized by a plurality of slits formed entirely through the thickness of said membrane and extending from said peripheral portion inwardly at least substantially to said membrane center to define a plurality of sectors integral with and extending from said peripheral portion inwardly of said membrane to cover said aperture means whereby said membrane may bend for movement hingedly of said sectors to uncover said aperture means when a pressure in said other chamber is substantially higher than a pressure in said one chamber to allow flow communication between the combustion chambers, and insulation means covering said membrane for precluding flow communication between the combustion chambers when a pressure in said one chamber is higher than a pressure in said other chamber.

22. A seal assembly according to claim 21 wherein said structural means has a generally circular shape, each of said aperture means is completely covered by one of said sectors, said plurality of aperture means includes a center aperture in said structural means, said plurality of slits each terminating radially inwardly at a point spaced radially from said center aperture, said membrane further characterized by a slit extending circularly around said center aperture and intersecting said points of termination of said plurality of slits from said point of termination of one of said plurality of slits to said point of termination of an adjacent one of said plurality of slits whereby one of the sectors completely covers the center aperture.

23. A seal assembly according to claim 21 wherein said structural means is erodible by gases of combustion of the propellant, said plurality of aperture means includes a center aperture surrounded by a row of six equally spaced apertures, said center aperture having a greater diameter than each of said row of six equally spaced apertures whereby the center aperture may erode such that its eroding edge intersects with the eroding edges of the row of apertures before their eroding edges intersect with each other.

24. A seal assembly according to claim 21 wherein said membrane has an inner marginal portion which has a hole therein, said slits terminate at a distance from said hole such that said membrane is tearable over said distance when a pressure in said other chamber is substantially higher than a pressure in said one chamber to allow the sectors to open out from said structural means to allow flow communication between the combustion chambers.

25. A seal assembly according to claim 21 wherein said membrane has an inner edge which defines a central hole therein, and said slits extend entirely to and intersect said inner edge so that said sectors are attached to the rest of said membrane only at said peripheral portion.

26. A seal assembly according to claim 21 wherein at least one portion of said membrane covering a corresponding one of said aperture means is dome-shaped and extends into said corresponding aperture means.

27. A rocket motor comprising at least two combustion chambers each having propellant material therein, structural means separating said combustion chambers, a centrally disposed aperture means in said structural means, an igniter means in one of said combustion chambers, means in the other of said combustion chambers for initiating said igniter means, means in said centrally disposed aperture means for connecting said igniter means to said initiating means for communication therebetween for initiation of said igniter means by said initiating means, means for sealingly preventing flow communication of combustion gases in said combustion chambers through said centrally disposed aperture means, a plurality of aperture means in said structural means and outwardly of said centrally disposed aperture means for providing flow communication between said combustion chambers, a membrane seal means disposed in said one combustion chamber for covering said flow communication aperture means and precluding flow communication between said combustion chambers when a substantially higher pressure is present in said one chamber than in said other chamber and for allowing flow communication between said chambers when a substantially higher pressure is present in said other chamber than in said one chamber, said membrane seal means comprising a membrane having a peripheral portion outwardly of said flow communicating aperture means which peripheral portion is attached to said structural means, said membrane also having an inner edge defining a passage through which said connecting means passes, said membrane characterized by a plurality of slits formed entirely through the thickness of said membrane and extending from said peripheral portion inwardly at least substantially to said inner edge to define a plurality of sectors integral with and extending from said peripheral portion inwardly of said membrane to cover said flow communicating aperture means whereby said membrane may bend for movement hingedly of said sectors to uncover said aperture means when a pressure in said other chamber is substantially higher than a pressure in said one chamber to allow flow communication between said combustion chambers, and insulation means covering said membrane for precluding flow communication between said combustion chambers when a pressure in said one chamber is higher than a pressure in said other chamber.

28. A rocket motor according to claim 27 wherein said slits terminate at a short distance from said membrane inner edge such that said membrane is tearable over said distance when a pressure in said other chamber is substantially higher than a pressure in said one chamber to allow said sectors to open out from said structural means to allow flow communication between said combustion chambers.

29. A rocket motor according to claim 27 wherein said slits extend entirely to and intersect with said membrane inner edge so that said sectors are attached to the rest of said membrane only at said peripheral portion.

30. A rocket motor according to claim 27 wherein said structural means has a surface facing said membrane seal means which is convex in shape.

31. A rocket motor according to claim 27 wherein at least one portion of said membrane covering a corresponding one of said aperture means is dome-shaped and extends into said corresponding aperture means.

\* \* \* \* \*